United States Patent Office 3,178,376
Patented Apr. 13, 1965

3,178,376
MOLDABLE POLYMERS AND PROCESS FOR PRODUCING SAME
Jack E. Cook, Bartlesville, Okla., assignor to Phillips Petroleum Company, a corporation of Delaware
No Drawing. Filed Dec. 2, 1960, Ser. No. 73,197
6 Claims. (Cl. 260—2)

This invention relates to novel moldable polymers. In accordance with one aspect, this invention relates to an improved process for producing moldable polymers from bis(halomethyl)aromatic compounds. In accordance with another aspect, this invention relates to novel polymers of bis(halomethyl)aromatic compounds which are soluble in hydrocarbon solvents and which are fusible under ordinary molding conditions and, therefore, are readily molded and extruded into various forms and shapes including sheets and fibers.

The preparation of polymers of o- and p-xylylene is well known and numerous studies have been made to clarify the mechanisms involved in developing the active monomers of the o- and p-xylylene type. However, the polymeric products obtained from these monomers have had little commercial interest because of their insolubility and infusibility, it being substantially impossible to utilize them in the production of molded objects for these reasons. Therefore, it can be seen that there is a distinct need in the art for moldable polymers of the xylylene-type.

In accordance with the present invention, it has now been discovered that new polymers which are soluble in hydrocarbon solvents and which are fusible can be prepared from bis(halomethyl)aromatic compounds. These polymers have high tensile strength and high melting temperatures and are, therefore, suitable for use in the fabrication of articles which can be made to withstand considerable stress at elevated temperatures.

Accordingly, it is an object of this invention to prepare a novel moldable polymer.

Another object of this invention is to prepare a polymer from a bis(halomethyl)aromatic compound.

A further object of this invention is to provide an improved process for the preparation of moldable polymers from bis(halomethyl)aromatic compounds.

Other aspects, objects and the several advantages of this invention are apparent from a study of the disclosure and the appended claims.

In accordance with the present invention, it has now been discovered that new moldable polymers can be prepared from the reaction of bis(halomethyl)aromatic compounds with a finely divided metal reactant or dehalogenating agent in the presence of water. The polymers produced by the reaction of this invention are fusible and soluble in organic solvents. Furthermore, these polymers have very high melting points and can be molded or extruded into various shapes and forms to form articles that are required to be used at elevated temperatures.

The bis(halomethyl)aromatic compounds employed include compounds of the general type $XCH_2ZCH_2X$ in which X is a halogen selected from the group consisting of chlorine, bromine and iodine and Z is an aromatic structure. The $—CH_2X$ groups are so placed on the aromatic structure that on removal of the X atoms, a quinonoid structure can be formed by the rearrangement of the electronic distribution in the cyclic portion of the molecule. For example, in the bis(halomethyl)benzenes useful in the present invention, the halomethyl groups will be in either the ortho or para positions with respect to each other on the benzene ring. In the bis(halomethyl)-naphthalenes, these groups can be in the 1,4- or 2,3-positions on a single ring of the molecule or they can be in the 2,6- or 3,7-positions. Similarly, compounds containing annular nitrogen are applicable in the practice of the invention if the above-mentioned requirement is met. For example, 2,5- or 3,6-dihalomethylpyridines can be used or dihalomethylquinolines capable of forming quinonoid structures by removal of the halogens from the halomethyl groups can be used.

Examples of suitable compounds of the above type are:

1,4-bis(chloromethyl)benzene
1,2-bis(chloromethyl)benzene
1,4-bis(chloromethyl)naphthalene
2,3-bis(chloromethyl)naphthalene
2,6-bis(chloromethyl)naphthalene
2,5-bis(chloromethyl)pyridine
2,3-bis(chloromethyl)pyridine
5,8-bis(chloromethyl)quinoline
6,7-bis(chloromethyl)quinoline
2,3-bis(chloromethyl)quinoline
3,7-bis(chloromethyl)quinoline
1,4-bis(bromomethyl)benzene
1,2-bis(iodomethyl)benzene
1,4-bis(bromomethyl)naphthalene
2,6-bis(bromomethyl)naphthalene
2,6-bis(iodomethyl)naphthalene
2,5-bis(bromomethyl)pyridine
2,3-bis(iodomethyl)pyridine
6,7-bis(bromomethyl)quinoline
2,3-bis(iodomethyl)quinoline and the like. These compounds contain 7–12 carbon atoms. The presence of from one to three methyl substituents on ring carbon atoms unoccupied by a halomethyl group is permissible, in which event, the total carbons can be 15. Examples of suitable aromatic compounds having methyl substituents include:

2-methyl-1,4-bis(chloromethyl)benzene
3-methyl-1,2-bis(chloromethyl)benzene
4-methyl-1,2-bis(chloromethyl)benzene
2-methyl-1,4-bis(bromomethyl)benzene
4-methyl-1,2-bis(iodomethyl)benzene
1,4-bis(chloromethyl)-2-methylnaphthalene
2,5-bis(chloromethyl)-4-methylpyridine
5,8-bis(chloromethyl)-7-methylquinoline
2,3-bis(bromomethy)-3-8-methylquinoline
1,2,4-trimethyl-3,7-bis(chloromethyl)naphthalene
1,6,7-trimethyl-2,3-bis(chloromethyl)naphthalene
2,4-dimethyl-3,7-bis(chloromethyl)quinoline and the like.

The term "aromatic" in the present application includes structure containing annular nitrogen atom, typified by pyridine and quinoline nuclei.

The finely divided or powdered metal employed in the reaction of the invention is selected from the metals in the electromotive series (as defined on page 154 of "Inorganic Chemistry," Thorne et al., 5th ed., Interscience Publishers, Inc., New York, New York, 1948) above nickel up to and including magnesium, and includes metals that are not readily reactive with water, i.e., cobalt, tellurium, cadmium, iron, gallium, chromium, zinc, manganese, aluminum, beryllium and magnesium. Preferably, the powdered metal reactant is selected from the group consisting of aluminum, zinc, and iron. The metal reactant or dehalogenating agents employed in accordance with this invention are preferably powdered or finely divided and will be 100 mesh or finer. U.S. Standard sieve sizes are intended whenever sieve or mesh sizes are used herein. The amount of powdered metal used in the process of this invention will generally be at least one equivalent of metal for each equivalent of halogen. For example, when operating with zinc, one mole of metal is added for each mole of bis(halomethyl)aromatic compound. Somewhat greater amounts can be used when desired.

Generally, the ingredients of the reaction are charged to a reactor which is maintained at a temperature range of about 50 to about 300° F. for about one to 25 hours, or more. Generally, the system is maintained under a pressure sufficient to maintain a liquid phase.

In accordance with one embodiment of the invention, the novel polymers of this invention are prepared by adding a bis(halomethyl)aromatic compound, as defined, and a powdered metal, as defined, to a reaction vessel containing water and preferably fitted with a stirrer and a condenser. The weight ratio of water to bis(halomethyl)-aromatic compound will range from about 25:1 to about 100:1. The mixture of bis(halomethyl)aromatic compound, water and powdered metal is refluxed, while being agitated, from 1 to 25 hours, or more, depending on the reactivity of the powdered metal employed. After the reaction mixture has been refluxed, it is allowed to cool to room temperature. The polymer is then recovered and treated to remove any free metal or other impurities, and dried.

At the end of the reaction period and prior to, or after cooling, the contents of the reactor are filtered to recover the polymer. The solids are digested with a suitable acid or base, such as concentrated hydrochloric acid or aqueous NaOH to remove metal salts and free metal, after which the polymer is collected in a filter and washed, preferably with water followed by methanol. It is usually desirable to break up the filter cake, say, in a comminuting device such as a Waring Blendor, conducting this operation in a wash liquid such as methanol after which the polymer is collected on a filter and dried. Molding of the polymer thus obtained is effected at temperatures above about 400° F., preferably between about 500 and about 700° F.

A better understanding of the invention can be obtained by referring to the following illustrative example which is not intended, however, to be unduly limitative of the invention.

*Example I*

A fusible and soluble p-xylene polymer was prepared by charging the following materials to one liter round bottom flask, equipped with a condenser and a stirrer:

11.27 g. (0.2 mole) iron powder
17.50 g. (0.1 mole) 1,4-bis(chloromethyl)benzene
500 ml. water The mixture was refluxed for 7 hours and allowed to cool to room temperature overnight. Then the mixture was refluxed for 8 hours and allowed to cool to room temperature over a period of about 2 days. The precipitate was filtered off and steeped in concentrated hydrochloric acid over a steam bath for 4 hours to remove any iron powder adhering to the precipitated polymer. The polymer was filtered again and washed with water and acetone and then dried overnight at 55° C. in a vacuum dried. The yield was 4.40 g. of a white solid polymer. The conversion of monomer to polymer was 42 percent, based on 17.50 grams 1,4-bis(chloromethyl)benzene. This polymer melts at a temperature between 440 and 470° F. The polymer thus obtained was readily compression molded at a temperature above its melting point.

The p-xylylene polymer produced is soluble in boiling tetralin and is fusible. Solubility was determined by placing a small piece (about 0.01 gram) of polymer cut from a compression molded specimen in about 30 ml. of tetralin and heating.

The polymers of the invention can be formed into items such as dishes, poker chips, pipe, gears, etc. by various molding processes such as injection molding, vacuum molding, and the like.

It will be evident to those skilled in the art that many variations and modifications can be practiced upon consideration of the foregoing disclosure. Such variations and modifications are believed to be within the spirit and scope of the present invention.

I claim:

1. A process for the preparation of a polymer which comprises reacting a bis(halomethyl) aromatic compound capable of forming a quinonoid structure on removal of the halo atoms selected from the group consisting of bis-(halomethyl)benzene, bis(halomethyl)naphthalenes, bis-(halomethyl)pyridines and bis(halomethyl)quinolines with a finely divided metal reactant selected from the group consisting of cobalt, tellurium, cadmium, iron, gallium, chromium, zinc, manganese, aluminum, beryllium and magnesium in water at a temperature ranging from about 50 to about 300° F.

2. A process for the preparation of a polymer which comprises reacting a bis(halomethyl) aromatic compound capable of forming a quinonoid structure on removal of the halo atoms selected from the group consisting of bis(halomethyl)benzenes, bis(halomethyl)naphthalenes, bis(halomethyl)pyridines and bis(halomethyl)quinolines with finely divided iron in water at a temperature ranging from about 50 to about 300° F.

3. A process for preparing a moldable polymer which comprises contacting 1,4-bis(chloromethyl)benzene with iron powder in water at a temperature ranging from about 50 to about 300° F. for a time sufficient to form a desired amount of polymer, and recovering polymer thus produced.

4. A polymer prepared by reacting a bis(halomethyl) aromatic compound capable of forming a quinonoid structure on removal of the halo atoms selected from the group consisting of bis(halomethyl(benzenes, bis(halomethyl)naphthalenes, bis(halomethyl)pyridines and bis-(halomethyl)quinolines with a finely divided metal reactant selected from the group consisting of cobalt, tellurium, cadmium, iron, gallium, chromium, zinc, manganese, aluminum, beryllium and magnesium in water at a temperature ranging from about 50 to about 300° F.

5. A polymer moldable above about 400° F. prepared by contacting 1,4-bis(chloromethyl)benzene with iron dust in water at a temperature ranging from about 50 to about 300° F., said polymer being soluble in boiling tetralin.

6. The molded polymer product of claim 5.

References Cited by the Examiner

UNITED STATES PATENTS

| 2,414,028 | 1/47 | Dietrich et al. | 260—2 |
| 2,719,131 | 9/55 | Hall | 260—2 |

FOREIGN PATENTS

| 517,738 | 2/40 | Great Britain. |

OTHER REFERENCES

Mann et al.: Journal Chemical Society, pages 2826–32 (1954).

Auspos et al.: Journal of Polymer Science, vol. 15, (1955), pages 19–29.

LEON J. BERCOVITZ, *Primary Examiner.*

H. N. BURSTEIN, J. R. LIBERMAN, *Examiners.*